Oct. 10, 1967   R. M. CARRIER, JR   3,346,097
ADJUSTABLE STROKE VIBRATORY FEEDER
Filed Oct. 20, 1965   2 Sheets-Sheet 1
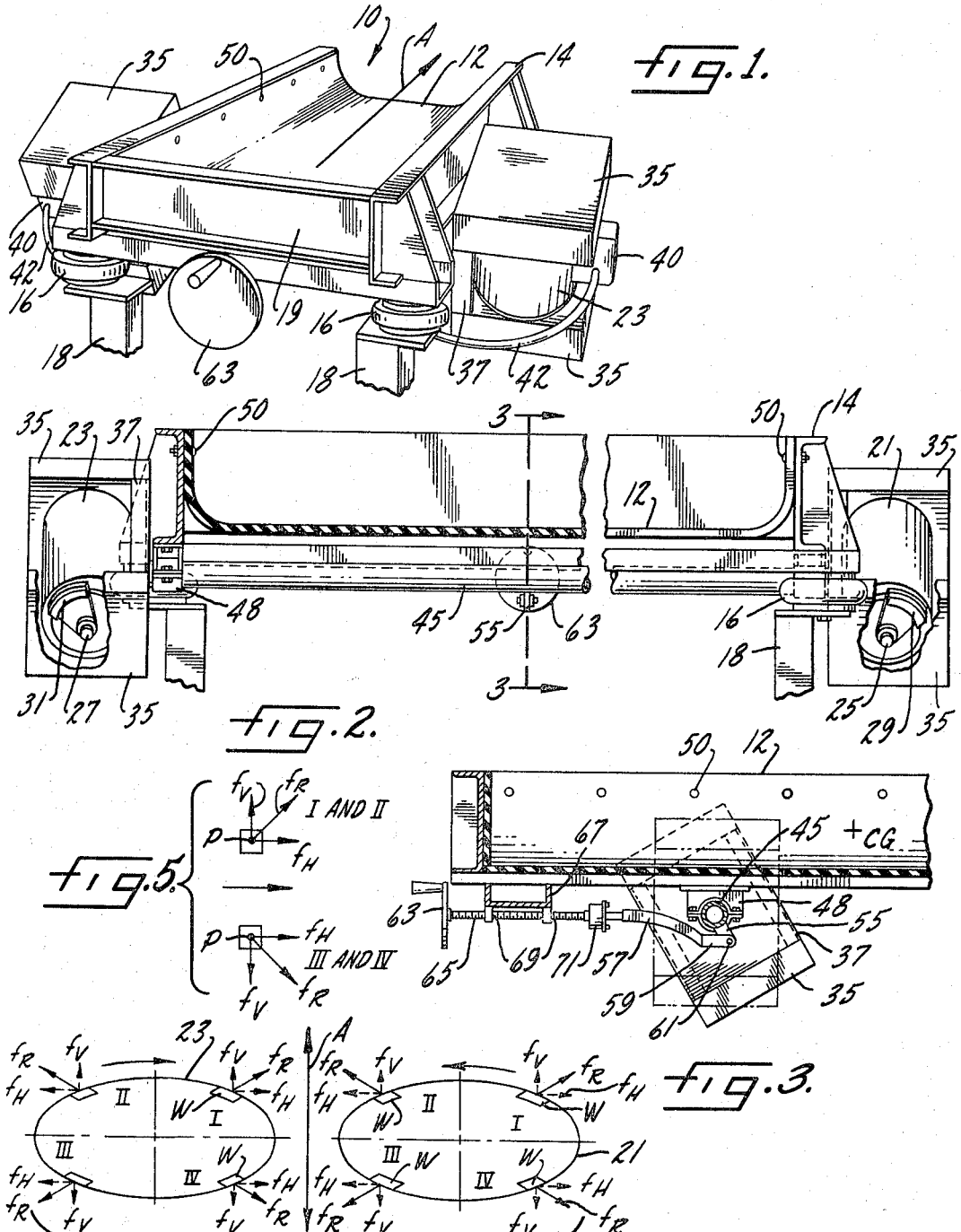
INVENTOR.
Robert M. Carrier, Jr.
BY
Mann, Brown & McWilliams
ATTORNEYS.

Oct. 10, 1967  R. M. CARRIER, JR  3,346,097
ADJUSTABLE STROKE VIBRATORY FEEDER
Filed Oct. 20, 1965  2 Sheets-Sheet 2
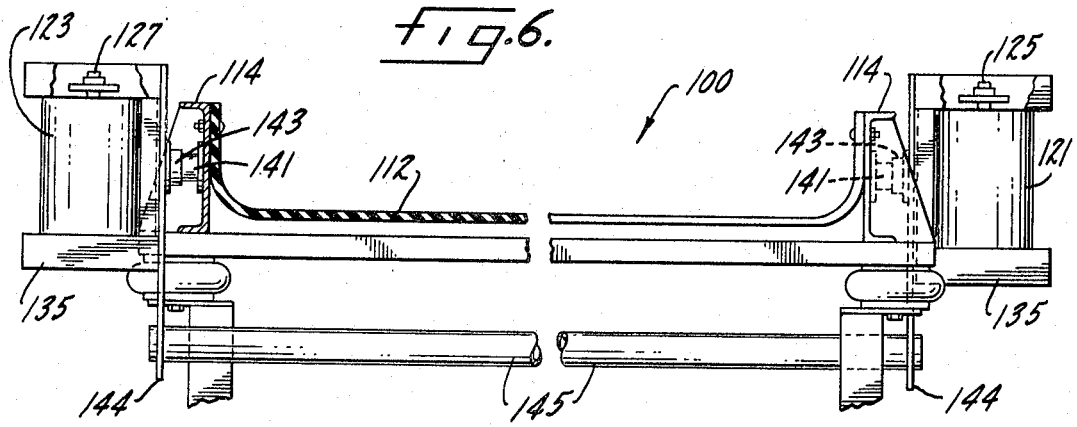
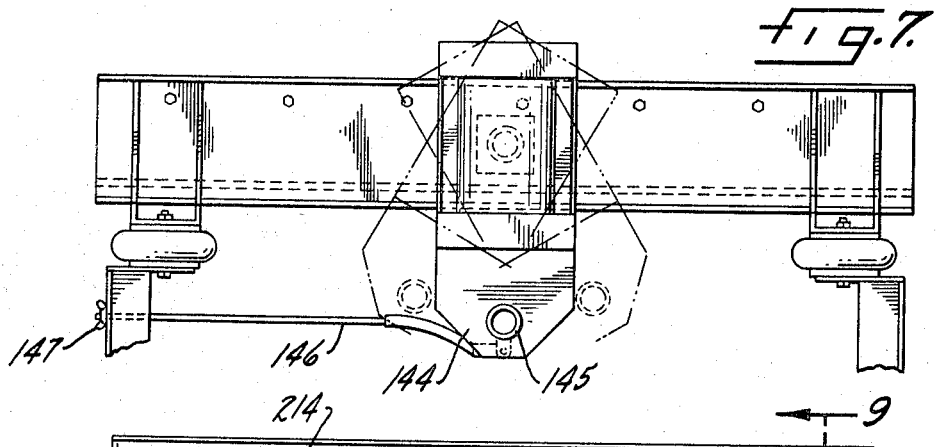
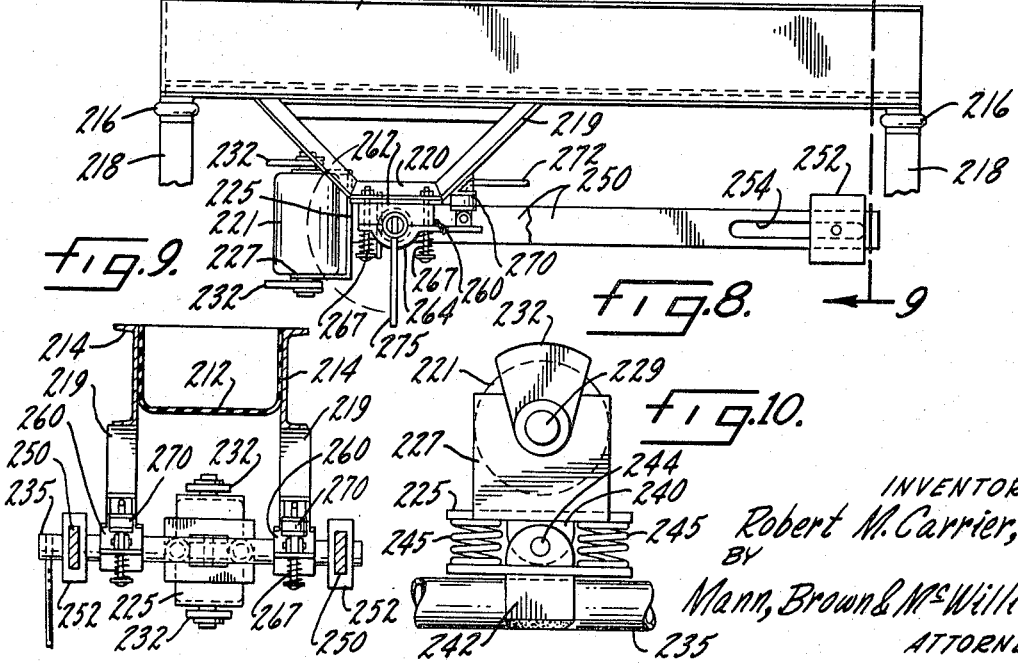
INVENTOR.
Robert M. Carrier, Jr.
BY
Mann, Brown & McWilliams
ATTORNEYS.

United States Patent Office 3,346,097
Patented Oct. 10, 1967

3,346,097
ADJUSTABLE STROKE VIBRATORY FEEDER
Robert M. Carrier, Jr., 3100 Upper River Road, Louisville, Ky. 40207; Louisville Trust Co., Elizabeth D. Carrier, Patrick H. Mitchell, and A. D. Stevens, executors and trustees of said Robert M. Carrier, Jr., deceased
Filed Oct. 20, 1965, Ser. No. 498,937
8 Claims. (Cl. 198—220)

ABSTRACT OF THE DISCLOSURE

The present invention relates to apparatus for conveying granular materials through the use of controlled vibration induced in a bed or pan. Vibration is induced by means of a rotating eccentric mass connected to the armature of one or more electric motors or the like. The motor drive for the eccentric mass is mounted on a supporting frame which is, itself, journalled to the bed or pan used for feeding purposes. The frame or mounting for the mass driving means is so constructed as to permit variations in the angle at which the resultant force developed by the rotating mass is applied to the bed or pan along which the particular matter is being conveyed and this provides a variable angle of attack type feeder, as distinguished from fixed angle of attack feeders.

Various forms of the invention are shown and described in the appended specification which include single and multiple electric motor drives variously positioned with respect to the bed or pan upon which the particulate matter is being conveyed.

---

The present invention relates to apparatus for conveying or feeding bulk aggregate or granular material, and provides adjustable stroke for varying both the feed rate and direction at which the particulate material is conveyed.

It is an object of the present invention to provide a vibratory conveyor having a novel stroke adjusting feature which permits virtual fingertip control of the feed rate of the particulate material being conveyed. It is an object, related to the foregoing, to provide a wide range of feed rates and to provide fine adjustment of the rate throughout the range provided.

It is an additional object of the invention to provide a vibrating system which is adaptable to either brute force or natural frequency systems, and which includes novel apparatus for mechanically permitting infinite variation of the feed rate and direction of flow of the conveyor over a wide range.

It is a further object of the invention to provide a drive system for a vibrating conveyor which is capable of operating the conveyor in either direction while providing the same wide range of flow rate and fine adjustment over the operating range thereof.

These and other objects and advantages will be evident from the following description, taken in conjunction with the appended drawings, wherein:

FIG. 1 is a perspective view of a conveyor embodying the present invention;

FIG. 2 is a transverse section of the conveyor of FIG. 1, illustrating certain details of construction thereof;

FIG. 3 is a partial view of the motor tilting apparatus of FIG. 1;

FIG. 4 is a force diagram illustrating the operation of the eccentric weights driven by the motors;

FIG. 5 is a force diagram illustrating the effect of the drive system upon a particle on the conveyor;

FIG. 6 is a view similar to FIG. 2, but illustrating a modified construction embodying the invention;

FIG. 7 is a side elevation of FIG. 6 illustrating the various positions which the motors may assume;

FIG. 8 is a side elevation of still another embodiment of the present invention;

FIG. 9 is an end view of a portion of the embodiment of FIG. 8, illustrating the details of the motor mounting to the conveyor pan; and FIG. 10 is an enlarged view of the motor and the associated cross shaft.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring now to the drawings, and more particularly to FIG. 1, one embodiment of the present invention is therein illustrated as a part of a vibrating pan or box type conveyor indicated generally at 10. The conveyor, as illustrated, comprises a conveying box or pan 12 of a trough shaped construction, mounted to a frame 14 of rigid, suitably gussetted, channel beam construction, the whole of which is resiliently mounted by means of pads 16, to a rigid base 18. An end plate 19 is likewise provided in FIGS. 1 through 3. The pads 16 may be of any suitable construction such as, e.g., fluid filled bags, or mechanical springs.

Particulate material is dumped on the box or pan of conveyor 10 by any suitable apparatus, such as an overhead hopper (not shown), and in accordance with the invention, the conveyor 10 includes a novel system for inducing controlled vibration to the pan, and thus to the particulate to feed the same at a prescribed rate, over the open end of the pan. The overall system, as illustrated in FIGS. 1 and 2 in particular, comprises a pair of matched drive motors 21 and 23 disposed on either side of the frame 14. The motors are of any suitable construction, and have armature shafts 25 and 27 respectively which extend axially through the motor casing. Each shaft mounts a pair of arcuately formed identical eccentric weights 29 and 31 respectively. The weights are connected in any suitable manner to the armature shaft which extends on both sides of the motor, and are so mounted that in operation they are effectively 180° out of phase with one another in a plane transverse to the pan. It is preferred that two smaller weights, disposed as described, be used to save on bearing wear, but a single weight might be used at one end of the shaft without departure from the invention. The eccentric weights disposed on a particular armature shaft are preferably parallel and radially oriented so that the total eccentric mass driven by a particular motor is the algebraic sum of the eccentric weights employed.

Each of the motors is disposed in a suitable cage having top and bottom shrouds 35 which enclose the eccentric weights as a protective measure. The shrouds are rigidly connected by suitable frame work 37 and each cage is rigidly connected to the motor housing it protects, thereby insuring a high degree of efficiency in the transmittal of the forces generated by the motor as the eccentric weights are rotated. The motors themselves are conveniently constant speed and of equal output. The motors are, in keeping with the invention, rotated in opposite directions. Power is supplied to each through a control box 40 having a conduit 42 connected to a suitable power source.

As the drawings disclose, the motors 21 and 23 are in parallel disposition on either side of the pan 12, and in order to achieve, in accordance with the present invention, optimum directional control of the forces generated by the motors, they are rigidly connected by means of the member 45. It is to be emphasized that in order to achieve optimum performance, the connection between the motors must be rigid, for this permits accurate phasing of each motor with the other. For this purpose, a heavy steel pipe, of a suitable diameter (a 4″ O.D. has been found to be effective) may be employed. The pipe is connected either directly to the motor housing, or to the cage about the motors, but in either event, the connection is rigid, and it is such that the axis of the armature shafts of the motors are, at all times, disposed parallel with one another in a plane transverse to the longitudinal axis of the bed.

In order that the forces generated by the motors, when operated, may be efficiently transmitted to the pan 12, the pipe 45 is journalled in low clearance bearings 48 to the frame 14 which firmly supports the pan by means of suitable bolts 50. It will be appreciated that the illustrated arrangement is of the brute force type. By this it is meant that the forces generated by the rotating motors 21 and 23 are transmitted directly through the pan to the particulate, and there is no attempt to take advantage of the natural frequency characteristics of the sprung mass. It is within the skill of the art, however, to adapt the present system to take advantage of the natural frequency of such mass, and this would, of course, be accomplished by providing suitable spring mountings for the pan and the driving forces generated by the motors 21 and 23 would then, of course, be synchronized to the natural frequency of the system.

Because of the particular disposition given the motors 21 and 23, it will be appreciated that the plane or planes in which the forces and components thereof generated by the motors 21 and 23, or components thereof, operate, will be identical. The present invention takes advantage of this relationship, and, as will be seen in FIG. 3, apparatus is provided for permitting infinite adjustment of the plane (hereinafter sometimes referred to as the angle of attack) through which the forces act, with the desirable result that the feed rate of the conveyor is adjustable over a wide range. This arrangement is in contrast to some known vibrating feeders wherein a variable amplitude force is applied through a fixed angle of attack.

Thus, the bearings 48, rather than providing a completely rigid connection between the cross member 45 and the frame 14, form a relatively tight bearing relationship therewith, permitting rotation of the member 45 within the bearings. To accomplish manual control of the motor position, a lug 55 is welded, or otherwise rigidly connected to the member 45, preferably somewhere near the center thereof, between the motors 21 and 23, and is formed with an aperture therein, for suitable engagement with the control member 57 having a jaw 59 through which a suitable pin 61 is passed to connect the end to the member 55. The member 57 is curved to prevent interference with the cross member and permit convenient placement of a hand crank 63. The crank 63 is fastened to a screw 65 held in place by a support 67 through which a pair of threaded apertures 69 are formed. Rotation of the crank member 63 will advance or retract the screw 65 longitudinally along the axis thereof. The screw 65 engages the control member 57 by means of a coupling 71 which permits free rotation of the end of the screw therein so that the rotary motion of the crank 63 is transmitted as strictly axial. As a result, the member 45 is rotated about its axis through an angle, which in practice, has been found sufficient to vary up to approximately 30° from the vertical.

FIG. 4 is a schematic representation of the relationship between the net rotating weights disposed on either side of the pan 12 in each of the four quadrants of rotation, and is intended to demonstrate, graphically, the components of force which the arrangement of the present invention causes to be applied to the pan 12. It will be observed, as stated above, that the two motors 21 and 23 are rotated in opposite directions. As exemplary, the motor 21 is shown to be rotating in a counterclockwise direction as viewed from the top thereof, and the motor 23 is rotated in a clockwise direction.

Assuming first, the condition wherein the armature shafts 25 and 27 are vertically disposed (not as shown in FIG. 2, where motors are tipped) and assuming that the pair of rotating eccentric weights on each shaft are equivalent to a single rotating eccentric mass, the centrifugal force generated by rotating the mass may be represented vectorally, and dividing the resultant force into components it will be seen that components would be generated which would tend to shake or vibrate the pan both transversely and longitudinally.

With reference to FIG. 4, it will be seen that because of the position of the weights on the shafts and the directional rotation given them, the transverse components will cancel one another while the longitudinal components will be additive.

For example, in FIG. 4 the letter W indicates the total effective weight rotated by each of the motors 21, 23 shown at a point in the four quadrants of rotation. Since the total effective mass on each is equal, the same subscript is used to show the relative position of the masses on each motor during rotation. Thus W, on motor 21, is advancing through quadrant I as W, on motor 23, advances through quadrant II toward the 90° position. W will arrive at the 90° and 270° point at the same time, but will always be 180° apart as they arrive at the 0° point and 180° point respectively. $W_2$, $W_3$ and $W_4$ are likewise representative of the relative positions of the rotating mass in point of time. Because of the phase relationship of the rotating masses, it will be seen that the transverse forces will, at all times, be vectorally zero. Thus, there would be no lateral shake in the pan whatsoever. On the other hand, the longitudinal components generated at the same time will be additive, along the axis A, and since the weights being rotated, and therefore the net mass being rotated by each motor, are identical, the amplitude of the vibration generated on the pan would be a function of the algebraic sum of the forces in the longitudinal direction. In this case, that would be twice the force generated by one motor, assuming no losses.

However, it will be appreciated that with the armature shafts in the vertical posture, and with the weights rotating at a constant speed, the component of force directed toward the open end of the pan 12 would be equal to that directed to the rear of the pan. As a consequence, a particle in the pan would be subjected to alternate longitudinal forces of equal magnitude, and as a result, its net movement in the desired direction of flow would be zero. Otherwise stated, the particles would vibrate back and forth on the pan, but would not progress along the pan as is desired.

It is a feature of the present invention that, with the arrangement described, the particles are not only moved towards the open end of the pan, but are so moved at a rate which can be controlled within a wide range. To this end, the motors are tipped about the axis of the rigid member 45 as indicated in FIG. 3. As previously stated, this is accomplished by rotating the crank 63 which, by virtue of the associated mechanism, causes the shaft 45 to rotate, changing the angle of attack of the forces generated by the eccentric mass on the rotating armature shafts. Consequently, the net longitudinal force resulting from the rotating mass about the armature shaft, while remaining equal in value, assumes a direction different from that discussed with respect to the situation where the motor shafts are vertically disposed.

Again referring to FIG. 4, the components of the resultant force on the rotating masses W, now involves not only a force in the longitudinal direction along the pan, but also a component of force in the vertical direction. As a consequence of the upwardly directed vertical component, a particle P on the pan 12 (as seen in FIG. 5) is caused to jump, or be accelerated from the surface of the pan, by upward movement thereof, where it is freed of frictional restraint as the pan moves downward due to the downwardly directed vertical component. The net effect of the upward and longitudinal forces on the particle is to urge it in the desired direction along the pan 12.

Referring to FIGS. 4 and 5, the effect of rotation of the weight W is the generation of a force on the weight tending to throw the same outwardly from a center of rotation. This force has been designated $f_R$, or the resultant force. More particularly, it is known as the centrifugal force and is a function of the speed of rotation and the total mass of the weight. The resultant force may be broken down into various components. For the purposes of illustration, it has been divided into a vertical component designated as $f_V$ and a horizontal component $f_H$. The weight W is, of course, for both motors, identical, and therefore the effective quantities of the forces on each weight are identical. Only the direction of the forces differs, and this particularly because of the difference in rotational direction of the motors.

Referring to FIG. 5, a particle P on the bed 12 of the conveyor is subjected to forces in a direction, and of a magnitude in accordance with the forces generated on the weights W, which are transmitted to the particles P. In a particular instance shown, particle P is illustrated in the force diagrams of FIG. 5, showing the forces to which it is subjected with the weights in the various quadrants. In quadrants I and II, for example, the forces will be the same and likewise in quadrants III and IV the forces will be the same. The magnitude of these forces will, however, vary as the weight W moves through the quadrant. This is basic vector analysis, however, and provides no particular problem in its understanding. With the motor tilted as illustrated in FIG. 3 in dotted lines, however, the resultant force on the particle P in the first and second quadrant, as illustrated, will be in a direction towards the open end of the conveyor, and upwardly.

In quadrants III and IV, the forces involved are inertial and gravitational because the conveyor has moved downward and away from the particle. The inertial force will cause some movement along the axis of the pan, and gravity will pull the particle down. Thus, the particle P is caused to "hop" toward the end of the conveyor at a rate which is, as previously indicated, a function of the angle of attack of the motors. The extent of the hop is determined by the angle at which the motor is disposed. As before stated, the feed rate is zero with the motors vertically disposed and increases to a maximum as the motors are tipped to about 30° from the vertical, depending of course on the character of the particulate.

It will be seen that the net or resultant force on a particle P in a pan will be generally in the direction opposite to that in which the motor is tipped from the vertical because the weights are effective at right angles to the axis of the motor. Otherwise stated, if it is the desire to move the particles toward the open end of the conveyor, shown in FIG. 3, operation of the hand crank 63 so as to cause rotation of the shaft 45 about its axis to move the motors to the left, or counterclockwise, would result in a net force on the particle to move it towards the open end of the pan.

In this posture, the transverse or lateral forces on the pan are still cancelled because of the directional rotation of the motors, but there is a net longitudinal effect on each particle on the pan causing it to move directionally along the axis A of the pan.

The particular angle of attack determines the value of the components of the net force on the particles in the pan. Thus, it will be appreciated that the particular angle at which the motor is tipped from the vertical will result in a variance in the vertical component from a very small amount when the motors approach the vertical to a large amount as they become horizontal. The horizontal component varies conversely to the vertical component while the resultant force remains constant. In this manner, the rate of forward movement of the particle is controlled, by varying the angle of attack of the applied vibratory force. Further, it will be appreciated that, by virtue of the finely adjustable screw arrangement, the amount of force effective to advance the particulate may be infinitely variable within the operative range of the device. The actual limit is, of course, with the motor in the horizontal position, in which case the particles would be subjected to pure vertical forces and would simply jump up and down on the pan.

Referring now to FIG. 6, there is shown a modification of the present invention wherein the motors are attached to the pan at the center of gravity of the spring mass, as contrasted to the embodiment of FIG. 1 wherein the motors are mounted below and to the left of CG (FIG. 3).

Referring to the drawing, a conveyor 100 is illustrated having a pan 112 supported by a pair of channel members 114 defining a frame therefor. The vibration control system for the conveyor 100, comprises a pair of motors 121 and 123 having armature shafts 125 and 127 respectively. Each shaft, as in the previous embodiment, is provided with an eccentric weight on either end thereof.

In order that the conveyor 100 might provide directional, as well as feed rate control, the motors 121 and 123 are placed at the center of gravity of the feeder pan and frame constituting the mass to be vibrated thereby. This is accomplished, in accordance with the invention, by journalling the motors to the frame 114 at the center of gravity (hereinafter referred to as CG). Accordingly, a pair of motor supports 141 extend transversely to the longitudinal axis of the pan, outwardly to serve as motor supports. The motors themselves, which are caged in shrouds 135, are journalled on the motor supports 141 by an appropriate bearing arrangement indicated generally at 143. It will be appreciated that the specific details of the bearing construction is well within the skill of the art, and from the standpoint of the invention, it is only necessary that there be a bearing relationship established which permits the motors to be rotated about the motor supports 141.

It is necessary, as indicated with respect to the FIG. 1 embodiment, that the two motors be phased together, and this is accomplished, in accordance with the present invention, by tying them rigidly together by means of crank members 144 which are rigidly secured to the cages about the motors in any convenient fashion such as by welding, and extend below the feeder pan to provide appropriate clearance for a cross shaft 145 which is rigidly connected to the crank members 144. Thus, the motors remain in perfect alignment, and are rigidly tied together in a manner similar to that set forth with respect to FIGS. 1 and 5, the difference lying in the operative position of the motors for transmittal of force which, in this instance, lies at the CG of the conveyor. Suitable position control is provided by the lever 146 which attaches to the cross bar 145 and is adjustably held in any convenient fashion with respect to the frame, as at 147.

It will be appreciated that any suitable means of swinging the cross shaft 145 about the motor supports 141, which, it will be seen, serve as pivots for the shaft, will result in the transmission of a variable effective force to the feeder pan. It will also be appreciated that by swinging the bar either to the left or right of vertical as seen in FIG. 7, will result in a changing direction of the particulate flow on the feeder pan. Thus, this conveyor arrangement permits feeding in two directions where such is desirable. Particulate would be dumped onto the pan somewhere in the center, and the pan would not have an end plate such as shown in FIG. 1. Thus, infinitely variable control over the feed rate is provided by the present invention, as well as a choice of the direction in which the particulate matter is to be conveyed.

Referring now to FIGS. 8 and 9, still another embodiment of which the invention is susceptible, is shown. This particular arrangement, unlike the preceding two, employs one motor. However, in terms of the operating principle, it is the same. By this it is meant that a constant speed motor is employed which generates a constant amplitude of vibration, and the angle of attack for applying this vibratory force is changed by tilting the axis of the motor.

More particularly, a conveyor pan 212 is illustrated, mounted to suitable channel members 214 supported upon suitable shock pads 216 mounted between the channel members and the rigid base 218. The single motor of the present invention is supported beneath the conveyor pan 212. To this end, a motor support frame 219, having a mounting plate 220, supports the motor 221.

The single motor is supported on a mounting frame 225 which has a pair of arms 227 extending on either side of the motor casing where they may be either fastened to the casing, or journalled on the motor shaft 229. A pair of identical arcuate eccentrically disposed weights 232 are fastened in aligned and parallel relation on the armature shaft 229 for rotation therewith. The motor 221, by means of frame 225, is secured to a cross shaft 235 which extends between suitable supports, connected with the pan support. Since only one motor is provided, it is desirable to provide means for neutralizing the lateral force components which tend to shake the conveyor pan from side to side and perform no useful work. This is accomplished, in accordance with the present invention, by mounting the frame 225 for a limited movement about a transverse axis parallel with the armature shaft 229. To this end, the frame 225 has a centrally disposed lug 240 formed as a part thereof, or otherwise secured to it. The lug 240 is constructed to fit in a suitable clevis 242 having aligned vertical apertures therein, and a clevis pin 244 passes to the apertures in the clevis and an associated aperture in the lug 240 to join the members together. Shock absorbing springs 245 are provided on either side of the clevis pin between the clevis and the frame 225. Thus, lateral forces generated by rotation of the eccentric weights 232 will cause the motor to rock about the clevis pin, and the springs 245 will absorb these forces without their being transmitted to the pan 212. In order to balance the motor 221 on the cross shaft 235, a pair of arms 250 are rigidly connected to the shaft 235 on either side of the motor. In the present instance, the arms 250 are mounted outboard of the pan connection, but it will be appreciated that they could be mounted inboard without departure from the invention. An adjustable weight 252 may be selectively positioned in a longitudinal slot 254 in the arms 250 so that perfect balance may be achieved, thereby eliminating undesirable interference vibration.

Because of the particular balance achieved by the construction herein referred to, with the considerable weight involved, it has been found desirable to provide means for selective clamping of the cross shaft 235 with respect to the shaft support. Accordingly, a pair of trunion bearings 260 are provided on either side of the motor for journalling the shaft 235 for a limited rotation. The trunnions 260, however, are constructed to permit a tight clamping of the shaft 235 when the particular angle of attack desired is achieved, thereby eliminating any play whatsoever in the bearings which might tend to accelerate wear on the bearings, as well as to inhibit the most efficient transmission of force to the conveyor pan possible. Thus, the bearing 260 comprises a base portion 262 and an adjustable cap 264. The cap is provided with shock absorbing springs 267 which bias the cap towards the base to close the bearing. An adjustable air cylinder 270 is provided between the supporting frame and the bearing cap, and by means of appropriate application of air pressure through a hose 272 to the cylinder, the bearing may be opened a slight amount to permit adjustment of the angle of attack of the motor. In this regard, it will be appreciated that any convenient means of rotating the shaft may be employed. In the present instance, a simple crank rod 275 extends transverse to the shaft, to permit manual rotation of the shaft, or some mechanical means may also be employed. Once the particular angle of attack desired has been achieved, the air cylinder is retracted, thus compressing the bearing cap about the shaft 235 with a resultant locking of the shaft is in the particular position desired and the device is ready for operation.

What is claimed is:

1. In combination with an elongated vibrating feeder having a pan open at one end thereof, means for imparting controlled vibration to said pan for feeding the contents thereof to said open end at a selectable rate, including electric motors each having a rotatable armature shaft disposed on either side of said pan, and connected thereto in force transmitting relation, a rigid member connecting said motors so that the armature shafts thereof are parallel, pairs of equal weights eccentrically mounted on the armature shafts of said motors, said armature shafts being driven in opposite directions, said motors being phased together so that vibrating forces developed by said rotating weights in a direction transverse to the longitudinal axis of said pan are vectorally zero, and control means connected with said rigid member for rotating the same to thereby vary the axial position of said shafts with respect to said pan and to vary the angle of attack of the vibrating forces developed by asid rotating weights with respect to said pan.

2. Apparatus for imparting controlled vibration to a vibrating conveyor or the like having a resiliently supported pan into which particulate matter is placed for conveying the contents thereof at a selectable rate, comprising electric motors disposed in alignment on opposite sides of said pan, a cross member rigidly connecting said motors so that the armature shafts thereof are parallel, said cross member being journalled to said pan at the center of gravity thereof, weights eccentrically mounted on the armature shafts of said motors, said armature shafts adapted to be driven in opposite directions so that said weights cause vibration in a plane longitudinally of said pan, and control means connected with said rigid member for rotating the same to thereby vary the axial position of said shafts with respect to said pan and to vary the angle of attack of the vibrating forces developed by said rotating weights with respect to said pan.

3. Apparatus as set forth in claim 2 wherein said rigid member is rotatable to position said motors in either direction from the vertical to thereby change the direction of flow as well as the feed rate.

4. Apparatus for imparting selective directional vibration to a conveyor of the type having a resiliently mounted pan, comprising motors, each having a drive shaft, said motors being located on either side of said pan and being rigidly joined to each other and rotatably journalled to said pan for varying the angle of attack of said motors with respect to said pan, each said shaft having an eccentric weight thereon, said weights being so located with respect to one another that when said motors rotate the resultant force on said pan is an oscillating force in the longitudinal direction of said pan, and means for rotating said motors about an axis transverse to said shafts so as to introduce a vertical force to said pan, thereby imparting movement to particulate in said pan at a rate which is a function of the angle which the armatures of said motors define with respect to the longitudinal axis of said pan, and a function of said angle of attack.

5. In combination with a vibratory conveyor, means for imparting controlled vibration to said conveyor for feeding the contents thereof at a selectable rate, including a pair of constant speed electric motors each having a rotatable armature shaft, said motors being parallel and aligned on opposite sides of said conveyor, a rigid member extending transversely of said conveyor for connecting said motors so that the armature shafts thereof are held parallel at all times, said rigid member being journalled to said conveyor, equal weights eccentrically mounted on the armature shafts of said motors when the motors are operating, said armature shafts being driven in opposite directions, whereby control vibration is imparted to said conveyor in the plane of the longitudinal axis thereof, and control means connected with said rigid member for rotating the same to thereby vary the axial position of said shafts with respect to said conveyor and to vary the angle of attack of the vibrating forces developed by said rotating weights with respect to said conveyor.

6. A drive unit for an elongated vibratory conveyor having a feeder pan into which particulate is placed, a motor having an armature shaft, an eccentric mass mounted on said shaft to develop a constant amplitude oscillating force in a plane longitudinally of said pan when said shaft is rotated, said motor being mounted for limited movement about a generally vertical pin, shock absorbers disposed about said mount to absorb forces generated by transverse movement of said motor about said pin, said pin being connected to said pan for transmittal of said oscillating force to provide an angle of attack to said pan for said force, and means for rotating said motor and said pin about a horizontal axis for changing the angle of the application of said oscillating forces and thereby vary said angle of attack so as to vary the relative magnitude of the horizontal and vertical components of said oscillating force.

7. A drive unit for imparting controlled vibration to a vibrating conveyor or the like having a resiliently supported pan into which particulate matter is placed for conveying the contents thereof at a selectable rate, comprising electric motors disposed in alignment on opposite sides of said pan, said motors being journalled to said pan in force transmitting relation while being rotatable relative thereto, a cross member rigidly connecting said motors so that the armature shafts thereof are parallel, said motors being journalled to said pan at the center of gravity thereof, weights eccentrically mounted on the armature shafts of said motors, the weight on the shaft of a motor on one side of said pan being positioned 180° out of phase with the weight on the shaft of a motor on the other side of said pan when the motors are operating, said armature shafts adapted to be driven in opposite directions, and control means connected with said rigid member for rotating the same to thereby vary the axial position of said shafts with respect to said pan and to vary the angle of attack of the vibrating forces developed by said rotating weights with respect to said pan.

8. In combination with an elongated feeder having a resiliently mounted pan, means for imparting controlled vibration to said pan for feeding the contents thereof at a selectable rate, including electric motors each having a rotatable armature shaft, a rigid member connecting said motors so that the armature shafts thereof are parallel, said rigid member being journalled to said pan, weights eccentrically mounted on the armature shafts of said motors, said armature shafts being driven in opposite directions to thereby generate a controlled amplitude vibratory force to said pan in a general direction longitudinally thereof, and control means connected with said rigid member for rotating the same to thereby vary the axial position of said shafts with respect to said pan and to vary the angle of attack of the vibrating forces developed by said rotating weights with respect to said pan.

References Cited

UNITED STATES PATENTS

| | | | |
|---|---|---|---|
| 3,053,380 | 9/1962 | Spurlin | 198—220 |
| 3,089,582 | 5/1963 | Musschoot et al. | 198—220 |

FOREIGN PATENTS

| | | |
|---|---|---|
| 828,219 | 2/1960 | Great Britain. |
| 984,575 | 2/1965 | Great Britain. |

EVON C. BLUNK, *Primary Examiner.*

M. L. AJEMAN, *Assistant Examiner.*